(12) United States Patent
Satterfield et al.

(10) Patent No.: US 8,356,122 B2
(45) Date of Patent: Jan. 15, 2013

(54) DISTRIBUTED TRACE USING CENTRAL PERFORMANCE COUNTER MEMORY

(75) Inventors: David L. Satterfield, Tewksbury, MA (US); James C. Sexton, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/684,804

(22) Filed: Jan. 8, 2010

(65) Prior Publication Data

US 2011/0173366 A1    Jul. 14, 2011

(51) Int. Cl.
*G06F 13/00* (2006.01)
*G06F 3/00* (2006.01)
*G06F 11/00* (2006.01)

(52) U.S. Cl. ........ 710/18; 710/8; 710/15; 710/100; 712/29; 712/227; 714/30; 714/31; 714/704

(58) Field of Classification Search .............. None
See application file for complete search history.

(56) References Cited

U.S. PATENT DOCUMENTS

| | | | | |
|---|---|---|---|---|
| 5,297,277 A * | 3/1994 | Dein et al. | | 714/45 |
| 5,804,986 A * | 9/1998 | Jones | | 326/40 |
| 5,881,223 A | 3/1999 | Agrawal et al. | | |
| 6,058,397 A * | 5/2000 | Barrus et al. | | 1/1 |
| 6,480,966 B1 | 11/2002 | Rawson, III | | |
| 6,925,424 B2 | 8/2005 | Jones et al. | | |
| 7,080,283 B1 * | 7/2006 | Songer et al. | | 714/30 |
| 7,188,277 B2 * | 3/2007 | Johnson | | 714/30 |
| 7,743,199 B2 * | 6/2010 | Gang et al. | | 710/316 |
| 8,055,805 B2 * | 11/2011 | Harriman et al. | | 710/3 |
| 2002/0184419 A1 * | 12/2002 | Creedon et al. | | 710/100 |
| 2003/0088753 A1 * | 5/2003 | Ikeda et al. | | 711/202 |
| 2004/0030873 A1 * | 2/2004 | Park et al. | | 712/245 |
| 2004/0193790 A1 * | 9/2004 | Johnson | | 711/110 |
| 2005/0155018 A1 | 7/2005 | DeWitt, Jr. et al. | | |
| 2007/0153821 A1 * | 7/2007 | Beshai | | 370/437 |
| 2007/0286327 A1 | 12/2007 | Love et al. | | |
| 2008/0046700 A1 | 2/2008 | Gara et al. | | |
| 2008/0126641 A1 * | 5/2008 | Irish et al. | | 710/112 |
| 2008/0320476 A1 * | 12/2008 | Wingard et al. | | 718/101 |
| 2009/0271553 A1 * | 10/2009 | Gang et al. | | 710/305 |
| 2011/0172968 A1 * | 7/2011 | Davis et al. | | 702/186 |
| 2011/0173366 A1 * | 7/2011 | Satterfield et al. | | 710/305 |

* cited by examiner

*Primary Examiner* — Tanh Nguyen
(74) *Attorney, Agent, or Firm* — Scully, Scott, Murphy & Presser, P.C.; Daniel P. Morris, Esq.

(57) ABSTRACT

A plurality of processing cores, are central storage unit having at least memory connected in a daisy chain manner, forming a daisy chain ring layout on an integrated chip. At least one of the plurality of processing cores places trace data on the daisy chain connection for transmitting the trace data to the central storage unit, and the central storage unit detects the trace data and stores the trace data in the memory co-located in with the central storage unit.

13 Claims, 4 Drawing Sheets

DISTRIBUTED TRACE USING CENTRAL PERFORMANCE COUNTER MEMORY

STATEMENT REGARDING FEDERALLY SPONSORED RESEARCH OR DEVELOPMENT

This invention was made with Government support under Contract No.: B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010, for "HARDWARE SUPPORT FOR COLLECTING PERFORMANCE COUNTERS DIRECTLY TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 61/261,269, filed Nov. 13, 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSE PROCESSOR HARDWARE THREAD UNTIL PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 13/004,005, filed Jan. 10, 2011, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION"; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010, for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CONSISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCRONIZATION INSTRUCTION; U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

FIELD

The present disclosure related to hardware performance counters.

BACKGROUND

Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation look aside buffer (TLB) misses, and others. A typical computing system provides a small number of counters dedicated to collecting and/or recording performance events for each processor in the system. These counters consume significant logic area, and cause high-power dissipation. As such, only a few counters are typically provided. Current computer architecture allows many processors or cores to be incorporated into a single chip. Having only a handful of performance counters per processor does not provide the ability to count several events simultaneously from each processor.

BRIEF SUMMARY

A distributed trace device, in one aspect, may include a plurality of processing cores, a central storage unit having at least memory, and a daisy chain connection connecting the central storage unit and the plurality of processing cores and forming a daisy chain ring layout. At least one of the plurality of processing cores places trace data on the daisy chain connection for transmitting the trace data to the central storage unit. The central storage unit detects the trace data and stores the trace data in the memory.

A method for distributed trace using central memory, in one aspect, may include connecting a plurality of processing cores and a central storage unit having at least memory using a daisy chain connection, the plurality of processing cores and the central storage unit being fowled in a daisy chain ring layout. The method also may include enabling at least one of the plurality of processing cores to place trace data on the daisy chain connection for transmitting the trace data to the central storage unit. The method further may include enabling the central storage unit to detect the trace data and store the trace data in the memory.

A method for distributed trace using central performance counter memory, in one aspect, may include placing trace data on a daisy chain bus connecting the processing core and a plurality of second processing cores to a central storage unit on an integrated chip. The method further may include reading the trace data from the daisy chain bus and storing the trace data in memory.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A centralized memory is used to store trace information from a processing core, for instance, in an integrated chip having a plurality of cores. Briefly, trace refers to signals or information associated with activities or internal operations of a processing core. Trace may be analyzed to determine the behavior or operations of the processing core from which the trace was obtained. In addition to a plurality of cores, each of the cores also referred to as local core, the integrated chip may include a centralized storage for storing the trace data and/or performance count data.

Each processor or core may keep a number of performance counters (e.g., 24 local counters per processor) at low resolution (e.g., 14 bits) local to it, and periodically transfer these counter values (counts) to a central unit. The central unit aggregates the counts into a higher resolution count (e.g., 64 bits). The local counters count a number of events, e.g., up to the local counter capacity, and before the counter overflow occurs, transfer the counts to the central unit. Thus, no counts are lost in the local counters.

The count values may be stored in a memory device such as a single central Static Random Access Memory (SRAM), which provides high bit density. The count values may be stored in a single central Static Random Access Memory (SRAM), which provides high bit density. Using this approach, it becomes possible to have multiples of performance counters supported per processor.

This local-central count storage device structure may be utilized to capture trace data from a single processing core (also interchangeably referred to herein as a processor or a core) residing in an integrated chip. In this way, for example, 1536 cycles of 44 bit trace information may be captured into an SRAM, for example, 256×256 bit SRAM. Capture may be controlled via trigger bits supplied by the processing core.

Figure 1:
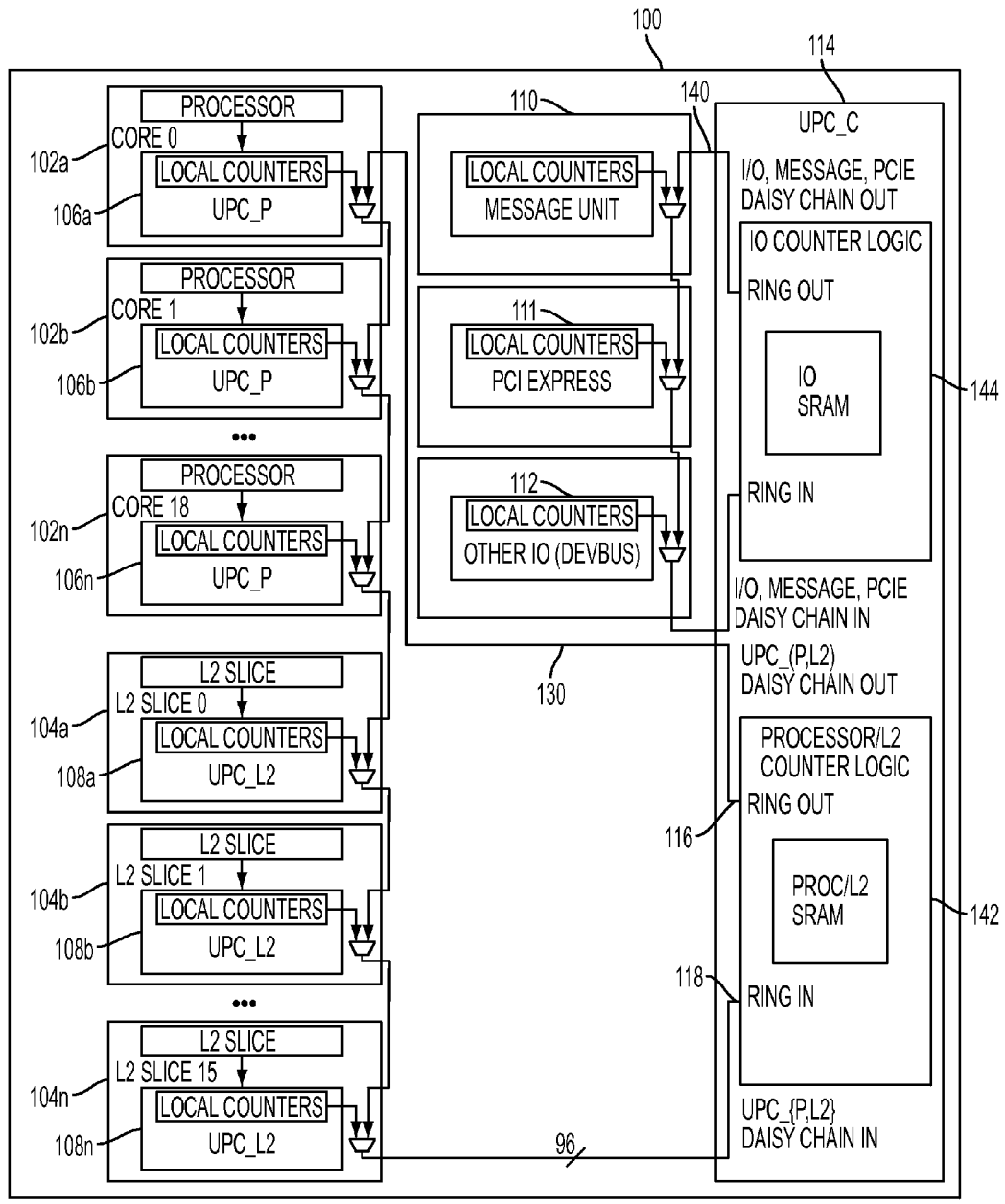
FIG. 1 is a high level diagram illustrating performance counter structure of the present disclosure in one embodiment.

FIG. 1 is a high level diagram illustrating performance counter structure of the present disclosure in one embodiment, which may be used to gather trace data. The structure illustrated in FIG. 1 is shown as an example only. Different structures are possible and the method and system disclosed herein is not only limited to the particular structural configuration shown. Generally, a processing node may have multiple processors or cores and associated L1 cache units, L2 cache units, a messaging or network unit, and PCIe/Devbus. Performance counters allow the gathering of performance data from such functions of a processing node and may present the performance data to software. Referring to FIG. 1, a processing node 100 also referred to as an integrated chip herein such as an application-specific integrated circuit (ASIC) may include (but not limited to) a plurality of cores (102a, 102b, 102n). The plurality of cores (102a, 102b, 102n) may also have associated L1 cache prefetchers (L1P). The processing node may also include (but not limited to) a plurality of L2 cache units (104a, 104b, 104n), a messaging/network unit 110, PCIe 111, and Devbus 112, connecting to a centralized counter unit referred to herein as UPC_C (114). In the figure, the UPC_P and UPC_L2 modules are all attached to a single daisy-chain bus structure 130. Each UPC_P/L2 module may sends information to the UPC_C unit via this bus 130. Although shown in FIG. 1, not all components are needed or need to be utilized for performing the distributed trace functionality of the present disclosure. For example, L2 cache units (104a, 104b, 104n) need not be involved in gathering the core trace information.

A core (e.g., 102a, 102b, 102n), which may be also referred to herein as a PU (processing unit) may include a performance monitoring unit or a performance counter (106a, 106b, 106n) referred to herein as UPC_P. UPC_P resides in the PU complex (e.g., 102a, 102b, 102n) and gathers performance data of the associated core (e.g., 102a, 102b, 102n). The UPC_P may be configured to collect trace data from the associated PU.

Similarly, an L2 cache unit (e.g., 104a, 104b, 104n) may include a performance monitoring unit or a performance counter (e.g., 108a, 108b, 108n) referred to herein as UPC_L2. UPC_L2 resides in the L2 and gathers performance data from it. The terminology UPC (universal performance counter) is used in this disclosure synonymously or interchangeable with general performance counter functions.

UPC_C 114 may be a single, centralized unit within the processing node 100, and may be responsible for coordinating and maintaining count data from the UPC_P (106a, 106b, 106n) and UPC_L2 (108a, 108b, 108n) units. The UPC_C unit 114 (also referred to as the UPC_C module) may be connected to the UPC_P (104a, 104b, 104n) and UPC_L2 (108a, 108b, 108n) via a daisy chain bus 130, with the start 116 and end 118 of the daisy chain beginning and terminating at the UPC_C 114. In a similar manner, messaging/network unit 110, PCIe 111 and Devbus 112 may be connected via another daisy chain bus 140 to the UPC_C 114.

The performance counter modules (i.e., UPC_P, UPC_L2 and UPC_C) of the present disclosure may operate in different modes, and depending on the operating mode, the UPC_C 114 may inject packet framing information at the start of the daisy chain 116, enabling the UPC_P (104a, 104b, 104n) and/or UPC_L2 (108a, 108b, 108n) modules or units to place data on the daisy chain bus at the correct time slot. In distributed trace mode, UPC_C 114 functions as a central trace buffer.

The performance counter functionality of the present disclosure may be divided into two types of units, a central unit (UPC_C), and a group of local units. Each of the local units performs a similar function, but may have slight differences to enable it to handle, for example, a different number of counters or different event multiplexing within the local unit. For gathering performance data from the core and associated L1, a processor-local UPC unit (UPC_P) is instantiated within each processor complex. That is, a UPC_P is added to the processing logic. Similarly, there may be a UPC unit associated with each L2 slice (UPC_L2). Each UPC_L2 and UPC_P unit may include a small number of counters. For example, the UPC_P may include 24 14 bit counters, while the UPC_L2 counters may instantiate 16 10 bit counters. The UPC ring (shown as solid line from 116 to 118) may be connected such that each UPC_P (104a, 104b, 104n) or UPC_L2 unit (108a, 108b, 108n) may be connected to its nearest neighbor. In one aspect, the daisy chain may be implemented using only registers in the UPC units, without extra pipeline latches.

For collecting trace information from a single core (e.g., 102a, 102b, 102n), the UPC_C 114 may continuously record the data coming in on the connection, e.g., a daisy chain bus, shown at 118. In response to detecting one or more trigger bits on the daisy chain bus, the UPC_C 114 continues to read the data (trace information) on the connection (e.g., the daisy chain bus) and records the data for a programmed number of cycles to the SRAM 120. Thus, trace information before and after the detection of the trigger bits may be seen and recorded.

Although not shown or described, a person of ordinary skill in the art will appreciate that a processing node may include other units and/or elements. The processing node 100 may be an application-specific integrated circuit (ASIC), or a general-purpose processing node.

The UPC_P and UPC_L2 modules may be connected to the UPC_C unit via a 96 bit daisy chain, using a packet based protocol. In trace mode, the trace data from the core is captured into the central SRAM located in the UPC_C 114. Bit fields 0:87 may be used for the trace data (e.g., 44 bits per cycle), and bit fields 88:95 may be used for trigger data (e.g., 4 bits per cycle).

Figure 2:
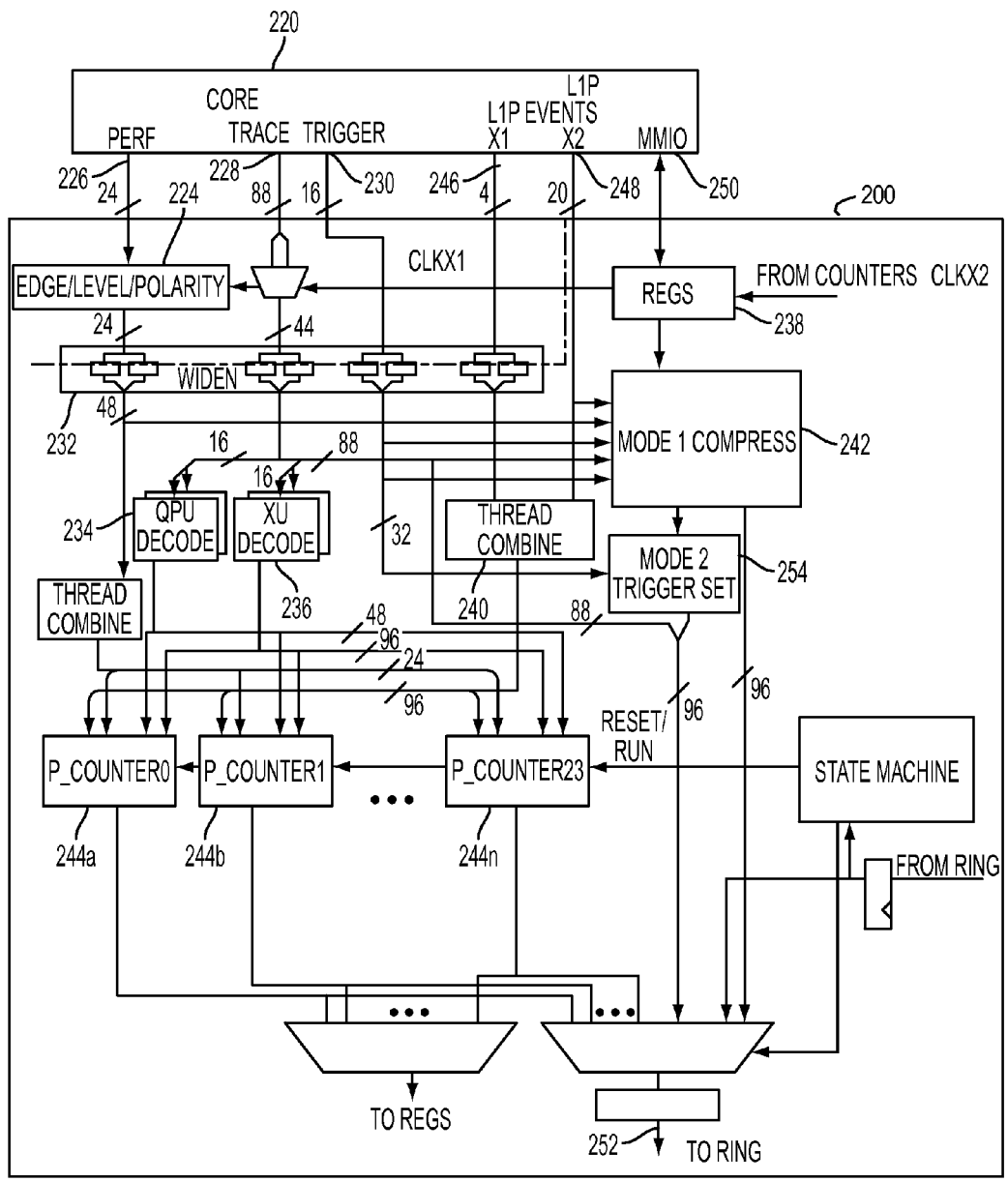
FIG. 2 illustrates a structure of the UPC_P unit in one embodiment of the present disclosure.

FIG. 2 illustrates a structure of the UPC_P unit or module in one embodiment of the present disclosure. The UPC_P module 200 may be tightly coupled to the core 220 which may also include L1 prefetcher module or functionality. It may gather trace data from the core 220 and present it to the UPC_C via the daisy chain bus 252 for further processing.

The UPC_P module may use the ×1 and ×2 clocks. It may expect the ×1 and ×2 clocks to be phase-aligned, removing the need for synchronization of ×1 signals into the ×2 domain. In one aspect, ×1 clock may operate twice as fast as ×2 clock.

Bits of trace information may be captured from the processing core 220 and sent across the connection connecting to the UPC_C, for example, the daisy chain bus shown at 252. For instance, one-half of the 88 bit trace bus from the core (44 bits) may be captured, replicated as the bits pass from different clock domains, and sent across the connection. In addition, 4 of the 16 trigger signals supplied by the core 220 may be selected at 254 for transmission to the UPC_C. The UPC_C then may store 1024 clock cycles of trace information into the UPC_C SRAM. The stored trace information may be used for post-processing by software.

Edge/Level/Polarity module 224 may convert level signals emanating from the core's Performance bus 226 into single cycle pulses suitable for counting. Each performance bit has a configurable polarity invert, and edge filter enable bit, available via a configuration register.

Widen module 232 converts clock signals. For example, the core's Performance 226, Trace 228, and Trigger 230 busses all may run at clk×1 rate, and are transitioned to the clk×2 domain before being processed. Widen module 232 performs that conversion, translating each clk×1 clock domain signal into 2 clk×2 signals (even and odd). This module is optional, and may be used if the rate at which events are output are different (e.g., faster) than the rate at which events are accumulated at the performance counters.

QPU Decode module 234 and execution unit (XU) Decode module 236 take the incoming opcode stream from the trace bus, and decode it into groups of instructions. In one aspect, this module resides in the clk×2 domain, and there may be two opcodes (even and odd) of each type (XU and QPU) to be decoded per clk×2 cycle. To accomplish this, two QPU and two XU decode units may be instantiated. This applies to implementations where the core 220 operates at twice the speed, i.e., outputs 2 events, per operating cycle of the performance counters, as explained above. The 2 events saved by the widen module 232 may be processed at the two QPU and two XU decode units. The decoded instruction stream is then sent to the counter blocks for selection and counting.

Registers module 238 implements the interface to the MMIO bus. This module may include the global MMIO configuration registers and provide the support logic (readback muxes, partial address decode) for registers located in the UPC_P Counter units. User software may program the performance counter functions of the present disclosure via the MMIO bus.

Thread Combine module 240 may combine identical events from each thread, count them, and present a value for accumulation by a single counter. Thread Combine module 240 may conserve counters when aggregate information across all threads is needed. Rather than using four counters (or number of counters for each thread), and summing in software, summing across all threads may be done in hardware using this module. Counters may be selected to support thread combining.

The Compress module 242 may combine event inputs from the core's event bus 226, the local counters 224a ... 224n, and the L1 cache prefetch (LIP) event bus 246, 248, and place them on the appropriate daisy chain lines for transmission to the UPC_C, using a predetermined packet format.

There may be 24 UPC_P Counter units in each UPC_P module. To minimize muxing, not all counters need be connected to all events. All counters can be used to count opcodes. One counter may be used to capture a given core's performance event or L1P event.

Referring to FIG. 2, a core or processor (220) may provide performance and trace data via busses. Performance (Event) Bus 226 may provide information about the internal operation of the core. The bus may be 24 bits wide. The data may include performance data from the core units such as execution unit (XU), instruction unit (IU), floating point unit (FPU), memory management unit (MMU). The core unit may multiplex (mux) the performance events for each unit internally before presenting the data on the 24 bit performance interface. Software may specify the desired performance event to monitor, i.e., program the multiplexing, for example, using a device control register (DCR) or the like. The software may similarly program for distributed trace. The core 220 may output the appropriate data on the performance bus 226 according to the software programmed multiplexing.

Trace (Debug) bus 228 may be used to send data to the UPC_C for capture into SRAM. In this way, the SRAM is used as a trace buffer. In one aspect, the core whose trace information is being sent over the connection (e.g., the daisy chain bus) to the UPC_C may be configured to output trace data appropriate for the events being counted.

Trigger bus 230 from the core may be used to stop and start the capture of trace data in the UPC_C SRAM. The user may send, for example, 4 to 16 possible trigger events presented by the core to the UPC for SRAM start/stop control.

MMIO interface 250 may allow configuration and interrogation of the UPC_P module by the local core unit (220).

The UPC_P 200 may include two output interfaces. A UPC_P daisy chain bus 252, used for transfer of UPC_P data to the UPC_C, and a MMIO bus 250, used for reading/writing of configuration and count information from the UPC_P.

Referring back to FIG. 1, a UPC_C module 114 may gather information from the PU, L2, and Network Units, and maintain 64 bit counts for each performance event. The UPC_C may contain, for example, a 256D×264W SRAM, used for storing count and trace information.

The UPC_C module may operate in different modes. In trace mode, the UPC_C acts as a trace buffer, and can trace a predetermined number of cycles of a predetermined number of bit trace information from a core. For instance, the UPC_C may trace 1536 cycles of 44 bit trace information from a single core.

The UPC_P/L2 Counter unit 142 gathers performance data from the UPC_P and/or UPC_L2 units, while the Network/DMA/I/O Counter unit 144 gathers event data from the rest of the ASIC, e.g., input/output (I/O) events, network events, direct memory access (DMA) events, etc.

UPC_P/L2 Counter Unit 142 may accumulate the trace data received from a UPC_P in the appropriate SRAM location. The SRAM is divided into a predetermined number of counter groups of predetermined counters each, for example, 32 counter groups of 16 counters each. For every count data or trace data, there may exist an associated location in SRAM for storing the count data.

Software may read or write any counter from SRAM at any time. In one aspect, data is written in 64 bit quantities, and addresses a single counter from a single counter group.

Figure 3:
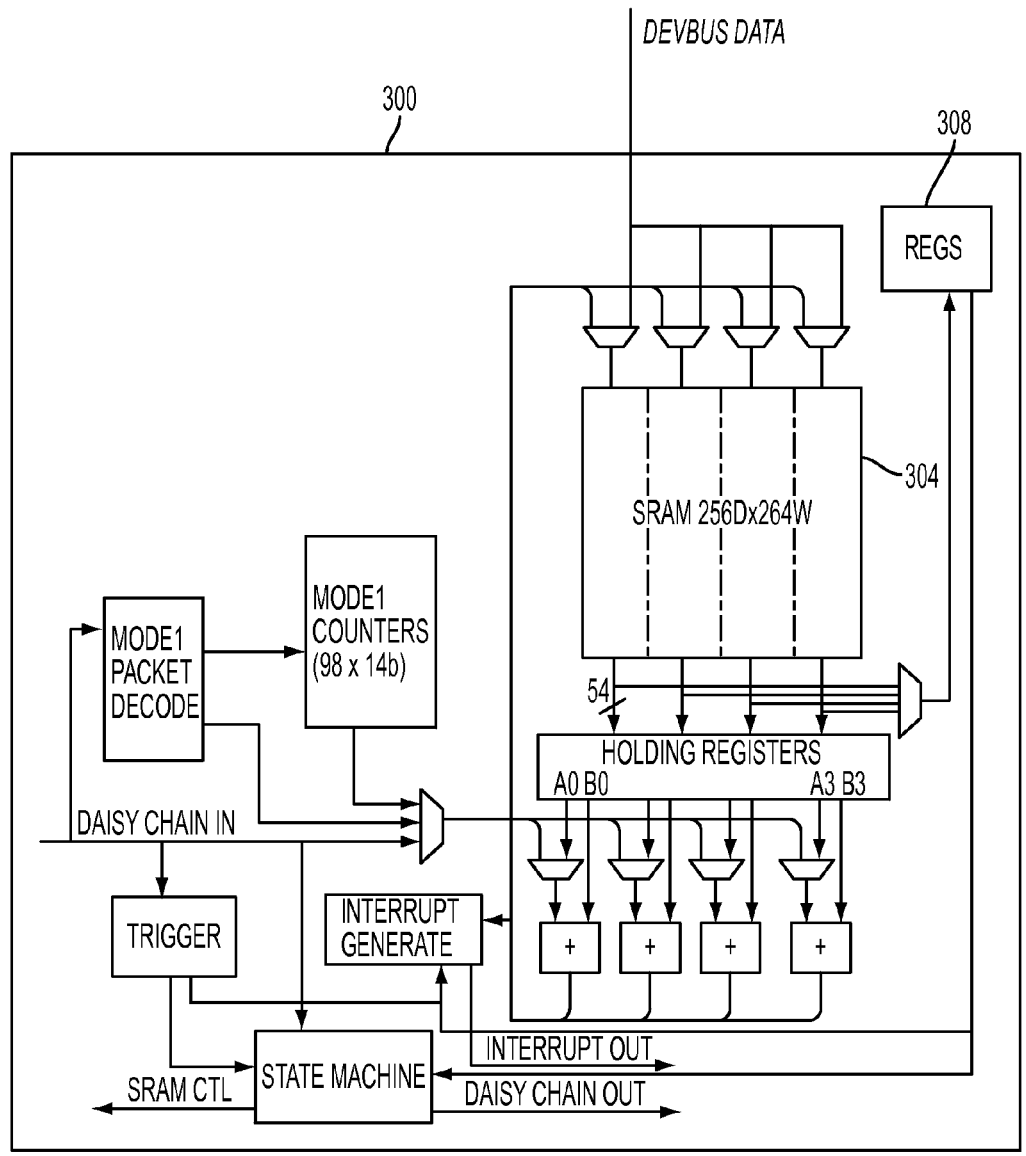
FIG. 3 illustrates an example structure of the UPC_C in one embodiment of the present disclosure.

FIG. 3 illustrates an example structure of the UPC_C 300 in one embodiment of the present disclosure. The SRAM 304 is used to capture the trace data. For instance, 88 bits of trace data may be presented by the UPC_P/L2 Counter units to the UPC_C each cycle. In one embodiment, the SRAM may hold 3 88 bit words per SRAM entry, for example, for a total of 256×3×2=1536 cycles of 44 bit data. The UPC_C may gather multiple cycles of data from the daisy chain, and store them in a single SRAM address. The data may be stored in consecutive locations in SRAM in ascending bit order. Other dimensions of the SRAM 304 and order of storage may be possible. Most of the data in the SRAM 304 may be accessed via the UPC_C counter data registers (e.g., 308). The remaining data (e.g., 8 bits residue per SRAM address in the above example configuration) may be accessible through dedicated Devbus registers.

The following illustrates the functionality of UPC_C in capturing and centrally storing trace data from one or more of the processor connected on the daisy chain bus in one embodiment of the present disclosure.

1) UPC_C is programmed with the number of cycles to capture after a trigger is detected.
2) UPC_C is enabled to capture data from the ring (e.g., daisy chain bus 130 of FIG. 1). It starts writing data from the ring into the SRAM. For example, each SRAM address may hold 3 cycles of daisy chain data (88×3)=264. SRAM of the UPC_C may be 288 bits wide, so there may be a few bits to spare. In this example, 6 trigger bits (a predetermined number of bits) may be stored in the remaining 24 bits (6 bits of trigger per daisy chain cycle). That is 3 cycles of daisy chain per SRAM location.
3) UPC_C receives a trigger signal from ring (sent by UPC_P). UPC_C stores the address that UPC_C was writing to when the trigger occurred. This for example allows software to know where in the circular SRAM buffer the trigger happened.

4) UPC_C then continues to capture until the number of cycles in step 1 has expired. UPC_C then stops capture and may return to an idle state. Software may read a status register to see that capture is complete. The software may then reads out the SRAM contents to get the trace.

The following illustrates the functionality of UPC_P in distributed tracing of the present disclosure in one embodiment.

1) UPC_P is configured to send bits from a processor (or core), for example, either upper or lower 44 bits from processor, to UPC_C. (e.g., set mode 2, enable UPC_P, set up event muxes).
2) In an implementation where the processor operates at a faster (e.g., twice as fast) than the rest of the performance counter components, UPC_P takes two ×1 cycles of 44 bit data and widens it to 88 bits at ½ processor rate.
3) UPC_P places this data, along with trigger data sourced from the processor, or from an MMIO store to a register residing in the UPC_P or UPC_L2, on the daisy chain. For example, 88 bits are used for data, and 6 bits of trigger are passed.

Figure 4:
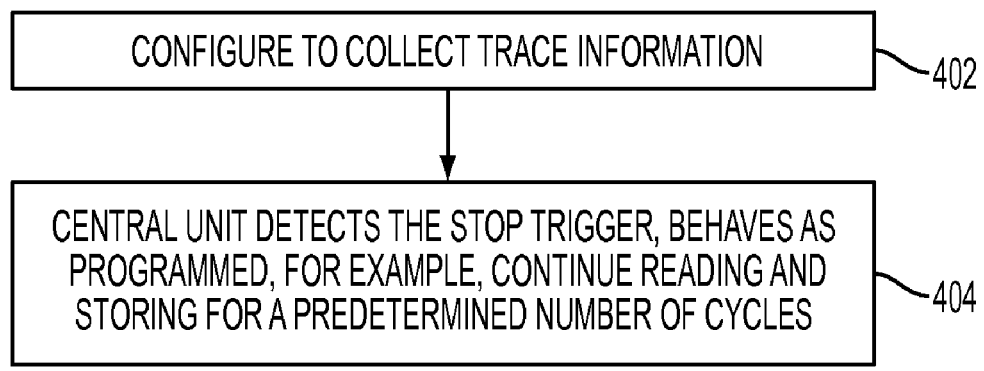
FIG. 4 illustrates a method for distributed trace using central performance counter memory in one embodiment of the present disclosure.

FIG. 4 is a flow diagram illustrating an overview method for distributed trace in one embodiment of the present disclosure. At 402, the devices or units (for example, shown in FIG. 1) are configured to perform the tracing. For instance, the devices may have been running in different operating capabilities, for example, collecting the performance data. The configuring to run in trace mode or such operating capability may be done by the software writing into one of the registers, for example, via the MMIO bus of a selected processing core whose trace data is to be acquired. Configuring at 402 starts the UPC_C to start capturing the trace data on the daisy chain bus.

At 404, the central counter unit detects the stop trigger on the daisy chain bus. Depending on programming, the central counter unit may operate differently. For example, in one embodiment, in response to detecting the stop trigger signal on the daisy chain bus, the central counter unit may continue to read and store the trace data from the daisy chain bus for predetermined number cycles after the detecting of the stop trigger signal. In another embodiment, the central counter unit may stop reading and storing the trace data in response to detecting the stop trigger signal. Thus, the behavior of the central counter unit may be programmable. The programming may be done by the software, for instance, writing on an appropriate register associated with the central counter unit. In another embodiment, the programming may be done by the software, for instance, writing on an appropriate register associated with the local processing core, and the local processing core may pass this information to the central unit via the daisy chain bus.

The store trace data on the SRAM may be read or otherwise accessible to the user, for example, via the user software. In one aspect, the hardware devices of the present disclosure allow the user software to directly access its data. No kernel system call may be needed to access the trace data, thus reducing the overhead needed to run the kernel or system calls.

The trigger may be sent by the processing cores or by software. For example, software or user program may write to an MMIO location to send the trigger bits on the daisy chain bus to the UPC_C. Trigger bits may also be pulled from the processing core bus and sent out on the daisy chain bus. The core sending out the trace information continues to place its trace data on the daisy chain bus and the central counter unit continuously reads the data on the daisy chain bus and stores the data in memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A distributed trace device, comprising:
  a plurality of processing cores, each of the plurality of processing cores having one or more local performance counters;
  a central storage unit having at least a memory;
  a daisy chain connection connecting the central storage unit and the plurality of processing cores and forming a daisy chain ring layout, wherein at least one of the plurality of processing cores places trace data on the daisy chain connection for transmitting the trace data to the central storage unit, and wherein the central storage unit detects the trace data and stores the trace data in the memory, wherein the local performance counters each comprise lower resolution memory than the memory of the central storage unit, wherein the local performance counters count and store a number of events, and before an overflow of the local performance counters occurs, the local performance counters transfer the count to the memory of the central storage unit via the daisy chain connection, the memory of the central storage unit aggregating the count of the number of events into higher resolution count for each of the respective local performance counters.

2. The device of claim 1, wherein the daisy chain connection includes a daisy chain bus.

3. The device of claim 1, wherein the plurality of processing cores are programmed by user software to start and stop placing the trace data.

4. The device of claim 3, wherein the plurality of processing cores include MMIO busses via which the user software can directly program the plurality of processing cores.

5. The device of claim 1, wherein the central storage unit includes an MMIO bus via which user software can directly access the trace data stored in the memory.

6. The device of claim 1, wherein the central storage unit detects a stop trigger signal to stop storing the trace data and in response to detecting the stop trigger, the central storage unit continues to detect and store the trace data for a predetermined number of cycles.

7. The device of claim 1, wherein the plurality of processing cores and the central storage unit are located on an integrated chip.

8. A method for distributed trace using a central memory, comprising:
connecting a plurality of processing cores and a central storage unit having at least a memory using a daisy chain connection, the plurality of processing cores and the central storage unit forming a daisy chain ring layout, each of the plurality of processing cores having one or more local performance counters;

enabling at least one of the plurality of processing cores to place trace data on the daisy chain connection for transmitting the trace data to the central storage unit; and enabling the central storage unit to detect the trace data and store the trace data in the memory, wherein the local performance counters each comprise lower resolution memory than the memory of the central storage unit, wherein the local performance counters count and store a number of events, and before an overflow of the local performance counters occurs, the local performance counters transfer the count to the memory of the central storage unit via the daisy chain connection, the memory of the central storage unit aggregating the count of the number of events into higher resolution count for each of the respective local performance counters.

9. The method of claim 8, wherein the daisy chain connection includes a daisy chain bus.

10. The method of claim 8, wherein the plurality of processing cores are programmable by user software to start and stop placing he trace data.

11. The method of claim 10, wherein each of the plurality of processing cores include an MMIO bus via which the user software can directly program respective said each of the plurality of processing cores.

12. The method of claim 8, wherein the central storage unit includes an MMIO bus via which user software can directly access the trace data stored in the memory.

13. The method of claim 8, wherein the central storage unit is enabled to detect stop a trigger signal to stop storing the trace data and in response to detecting the stop trigger, the central storage unit is enabled to continue to detect and store the trace data for a predetermined number of cycles.

* * * * *